April 23, 1957     W. WRIGHT     2,789,665
EMERGENCY BRAKES FOR TRAILER TRUCKS AND THE LIKE
Filed Jan. 25, 1954
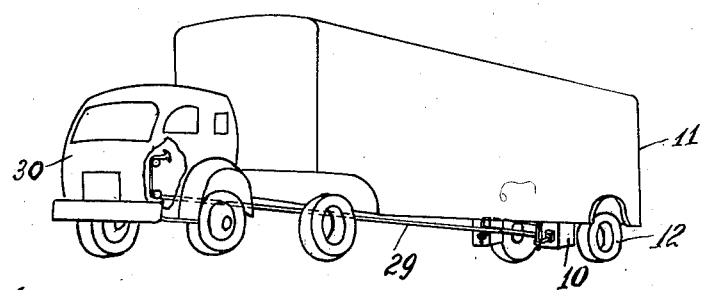
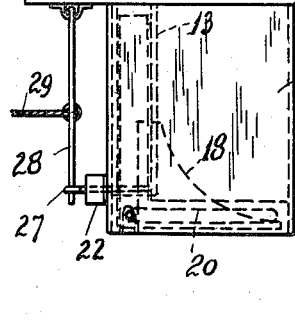
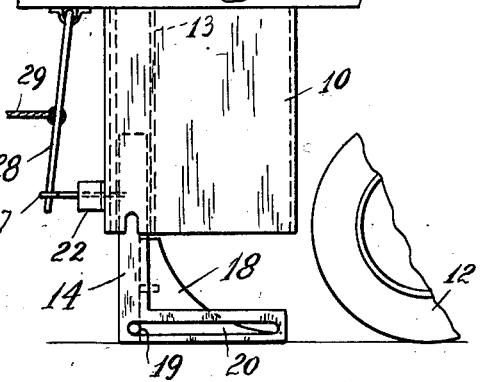
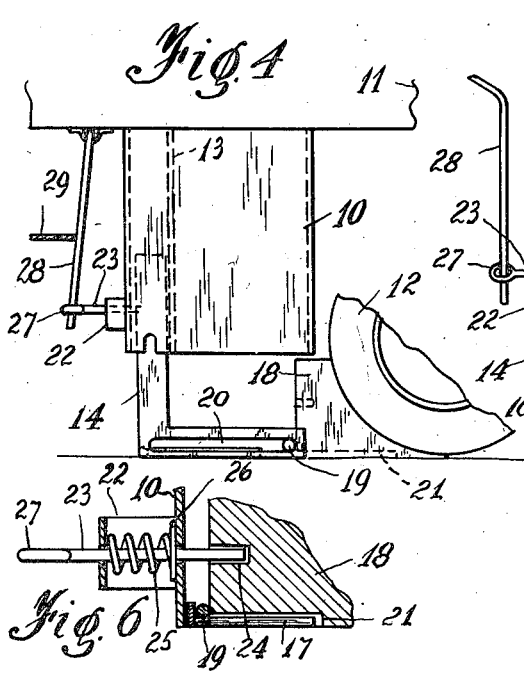
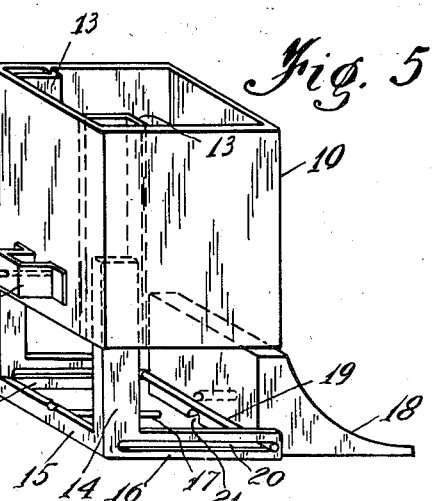
INVENTOR:
William Wright,
BY Raeph
Attorney.

United States Patent Office 2,789,665
Patented Apr. 23, 1957

2,789,665

EMERGENCY BRAKES FOR TRAILER TRUCKS AND THE LIKE

William Wright, Pittsburgh, Pa.

Application January 25, 1954, Serial No. 405,940

10 Claims. (Cl. 188—4)

This invention relates to emergency braking systems and particularly to positive, reliable and simple emergency brakes adapted for use on trailers and the like.

There has long been a need for a positive and reliable emergency brake for vehicles and particularly for large trucks, semi-trailers and trailers. Such vehicles carry tremendous loads and if the motor fails or the normal braking system fails it is frequently impossible to stop the vehicle. Motor failures and brake failures in such vehicles have resulted in many serious and fatal accidents.

No successful positive and reliable emergency braking system has heretofore been proposed for such vehicles.

An object of the present invention is to provide a positive, reliable and simple emergency braking system adapted for vehicles particularly adapted for use on trailers and the like.

Another object of this invention is to provide a wheel chock operable at the will of a vehicle operator to position itself in front of a wheel to be stopped.

A further object of this invention is to provide a wheel chock automatically operable to brake the wheels of a semi-trailer or trailer upon a separation from the tractor or prime mover.

A further object of this invention is to provide wheel chocks whose operation is not affected by dirt or water.

Still another object of the present invention is to provide a braking system which is entirely independent of other brake systems used on the vehicle.

Other objects, advantages and uses of this invention will become apparent from a consideration of the following description and the accompanying drawings in which:

Figure 1 is an isometric view, partly cut away of a tractor and semi-trailer incorporating the emergency brake of this invention.

Figure 2 is a side elevation of a wheel chock and housing according to this invention in the closed position.

Figure 3 is a side elevation of the wheel chock and housing of Figure 2 in the lowered position.

Figure 4 is a side elevation of the wheel chock and housing of Figure 2 with the wheel chock in braking position.

Figure 5 is an enlarged isometric view of the wheel chock and housing in braking position as shown in Figure 4.

Figure 6 is a fragmentary section of the wheel chock and housing of Figure 2 showing the locking pin arrangement.

Referring to the drawings there is illustrated a box like housing 10 mounted on the frame of a semi-trailer 11 in front of the wheels 12. The two forward corners of the housing 10 are provided with guide channels 13 which receive vertical arms 14 of a chock carrying frame 15. The chock carrying frame 15 is adapted to set inside the base of the housing 10 and is provided with side guide arms 16 and a central guide pin 17. The wheel chock 18 is provided with an arcuate tire engaging surface and a flat base and is fixed to a horizontal bar 19 slidable in slots 20 in the side guide arms 16. A slot 21 is provided in the bottom of the chock to support it during raising and lowering into and out of housing 10. The housing 10 is provided with a U-shaped member 22 adjacent the bottom thereof and carrying a pin 23 passing through the wall of housing 10 and adapted to enter an opening 24 in the rear of the wheel chock to hold it and the chock frame in closed position in the housing. A spring 25 is mounted within the U-shaped member and bears against a shoulder 26 on the pin 23 to hold it in engagement with the opening 24 in the wheel chock. The outer end of the pin 23 is preferably provided with a ring 27. The free end of a crank arm 28 pivoted on the trailer frame is in engagement with the ring 27. Cables 29 extend from a point intermediate the ends of the crank arm 28 to a control arm in the cab 30 of the vehicle.

In the event that it becomes necessary to use the emergency brake of this invention the operator of the vehicle operates the control arm in the cab which pulls the cables 29 and thereby rotates crank arm 28 about its pivot on the trailer frame. The free end of the crank arm pulls pin 23 forward out of opening 24 in the chock 18 which permits the chock and frame to drop to the roadway as in Figure 3. The bottom of the wheel chocks 18 engage the surface of the roadway while the frame and housing move forward with the vehicle until the wheels 12 run onto the arcuate surface of the wheel chock which holds them and acts to stop the entire vehicle.

In the event that the tractor or prime mover severates from the trailer the cables 29 will be pulled forward releasing the wheel chocks to stop the forward movement of the trailer.

While a preferred embodiment of the invention has been illustrated and described herein it will be understood that this invention may be otherwise embodied within the scope of the following claims.

I claim:

1. An emergency braking system for wheeled vehicles comprising vertically extending guide means fixedly mounted in front of a wheel of said vehicle, frame means movable vertically in said guide means from a raised position above a wheel travel surface to a position in contact with the travel surface, a wheel chock slidably mounted in said frame for movement vertically therewith and horizontally thereon, locking means on the guide means normally holding said frame and chock in said guide means in the raised position and release means releasing the locking means to permit the frame means to move vertically downwardly whereby the chock engages the travel surface and moves horizontally beneath the wheel of the vehicle.

2. An emergency braking system as claimed in claim 1 wherein the locking means is a spring loaded pin normally biased into engagement with the wheel chock.

3. An emergency braking system as claimed in claim 1 wherein the locking means is a spring loaded pin normally biased into engagement with the wheel chock and the release means is a crank arm pivoted at one end on the vehicle frame and engaging the spring loaded pin with the opposite end and cable means fixed to said crank arm intermediate the ends thereof and extending to a point adjacent the operator.

4. An emergency braking system for wheeled vehicles comprising a quadrangular housing opening at the bottom and mounted in front of a wheel of said vehicle, guide means in said housing, frame means movable vertically in said guide means in and out of the housing, a wheel chock slidably mounted in said frame for movement horizontally thereon, locking means on the housing normally holding said frame and chock in said housing, and release means releasing the locking means to permit the frame means to move vertically.

5. An emergency braking system as claimed in claim 4 wherein the frame means includes spaced apart substantially parallel vertical arms slidably engaged in the guide means in the housing and spaced apart substantially parallel side guide arms slidably carrying the wheel chock.

6. An emergency brake system as claimed in claim 4 wherein the wheel chock is mounted between spaced apart substantially parallel side guide arms and is movable horizontally and pivotally in elongated slots therein.

7. An emergency brake system for wheeled vehicles comprising a quadrangular housing open at the bottom and mounted in front of a wheel of said vehicle, vertical guide means in said housing, a frame means movable vertically in said guide means in and out of said housing, said guide means having spaced apart substantially vertical arms slidably engaged in the guide means and spaced apart substantially parallel side guide arms, elongated horizontal slots in said guide arms, a wheel chock movable horizontally and pivotally in said slots, locking means on the housing normally holding said frame and chock in said housing, and release means releasing the locking means to permit the frame and chock to move vertically out of the housing.

8. An emergency braking system as claimed in claim 7 wherein the locking means is a spring loaded pin normally biased into engagement with the wheel chock.

9. An emergency braking system as claimed in claim 7 wherein the frame is provided with horizontal pin means engaging the wheel chock and preventing pivoted movement in the slot except adjacent the ends thereof.

10. An emergency braking system as claimed in claim 7 wherein the locking means is a spring loaded pin normally biased into engagement with the wheel chock and the release means is a crank arm pivoted at one end on the vehicle and engaging the spring loaded pin at the opposite end and cable means fixed to said crank arm intermediate the ends thereof and extending to a point adjacent the operator.

References Cited in the file of this patent

UNITED STATES PATENTS

| | | |
|---|---|---|
| 917,598 | Hauser | Apr. 6, 1909 |
| 1,384,589 | Blaney | July 12, 1921 |
| 1,482,538 | Arnold | Feb. 5, 1924 |
| 1,801,809 | Fyfe | Apr. 21, 1931 |

FOREIGN PATENTS

| | | |
|---|---|---|
| 27,324 | Great Britain | Dec. 11, 1902 |